United States Patent [19]
Kamens et al.

[11] Patent Number: 5,623,185
[45] Date of Patent: Apr. 22, 1997

[54] ADJUSTABLE DRIVE CIRCUIT FOR CAPACITIVE ELECTROLUMINESCENT LAMPS

[75] Inventors: Bruce H. Kamens, Thomaston; Victor E. Shiff, Wolcott, both of Conn.

[73] Assignee: Timex Corporation, Middlebury, Conn.

[21] Appl. No.: 427,319

[22] Filed: Apr. 24, 1995

[51] Int. Cl.$^6$ .......................... G04B 19/30; H05B 37/00
[52] U.S. Cl. ...................... 315/169.3; 315/246; 368/68; 368/69; 368/67
[58] Field of Search ............... 315/169.3, 226, 315/246; 368/67, 68, 69

[56] References Cited

U.S. PATENT DOCUMENTS

| | | | |
|---|---|---|---|
| 4,084,401 | 4/1978 | Belardi et al. | 368/34 |
| 4,208,869 | 6/1980 | Hanaoka | 368/84 |
| 4,527,096 | 7/1985 | Kindlmann | 315/169 |
| 4,912,688 | 3/1990 | Syfert | 368/67 |
| 5,172,032 | 12/1992 | Alessio | 315/169.3 |

Primary Examiner—Robert Pascal
Assistant Examiner—Arnold Kinkead
Attorney, Agent, or Firm—William C. Crutcher

[57] ABSTRACT

A drive circuit having a converter that provides current pulses that charge a capacitive electroluminescent (EL) lamp to produce light, a switching circuit that switches successive current pulses for progressively charging the EL lamp and an adjustable circuit that permits external control of the switching circuit to provide a plurality of different predetermined numbers of the current pulses to the EL lamp is disclosed.

13 Claims, 3 Drawing Sheets

ADJUSTABLE DRIVE CIRCUIT FOR CAPACITIVE ELECTROLUMINESCENT LAMPS

This invention relates to electroluminescent lamps, as are used to light timepiece displays. More specifically, the invention relates to a drive circuit that provides an adjustable light intensity for an electroluminescent lamp.

BACKGROUND OF THE INVENTION

Electroluminescent (EL) lamps having different characteristics and electronic circuits used to drive the lamps are shown extensively in the prior art. For example, U.S. Pat. No. 4,527,096, incorporated herein by reference, issued on Jul. 2, 1985 to Kindlmann and assigned to the present assignee, discloses a drive circuit for a timepiece which includes a converter that provides current pulses for charging a capacitive EL lamp to produce light and a switching circuit that switches a predetermined number of successive current pulses at high frequency for progressively charging the EL lamp. The switching circuit, which is also referred to hereinafter as the charging switching means, also reverses the polarity of the electroluminescent lamp at low frequency when the EL lamp discharges at the end of a predetermined number of successive current pulses, and before the EL lamp charges again by current pulses produced by the converter. The switching circuit is connected to and is responsive to signals provided by a timepiece frequency divider circuit (signal generating means), and the converter is connected to a timepiece battery for stepping up the battery voltage to provide for the charging current pulses. The drive circuit of the Kindlmann patent delivers substantially all of the energy provided by the converter to the capacitive EL lamp.

FIG. 1 is a circuit diagram of the drive circuit 10 disclosed in the Kindlmann patent. An inductor 12 has one terminal electrically connected to the anode of a diode 14 and a switch 5 at a common point 13, and a second terminal electrically connected to a battery $V_s$. The inductor 12-diode 14-switch 5 combination forms the converter 20 that steps up the battery voltage. The converter 20 is electrically connected to the EL lamp 21 through the switching circuit which comprises switches 1, 2, 3 and 4. The gating signals used to open (switch off) and close (switch on) switches 1, 2, 3 and 4 are provided by the timepiece binary frequency divider circuit (not shown) which, as is understood, generally comprises serially connected flip-flops electrically connected to the timepiece crystal controlled oscillator. Switch 5 is also electrically connected to an intermediate stage of the divider circuit (signal generating means). The signal provided to switch 5 is in a predetermined relationship with the gating signals that control switches 1, 2, 3 and 4. The signal provided to switch 5 is at a much higher frequency than the gating signals provided to switches 1, 2, 3 and 4. The current pulses provided by the drive circuit 10 that progressively charge the EL lamp 21 are shown in FIG. 2. Note the discharging and the polarity reversal of the EL lamp after a predetermined number of successive current pulses.

It is well-known in the art that the brightness of an EL lamp is dependent on the applied voltage. See U.S. Pat. No. 4,208,869 issued on Jun. 24, 1980 to Hanaoka, FIG. 15 and accompanying explanation. As the voltage applied to the EL lamp increases, the brightness increases. Conversely, as the applied voltage decreases, so does the brightness. Notwithstanding this common knowledge, none of the drive circuits known by the applicant provides a means for controlling the level of voltage applied to the EL lamp to vary its brightness.

Thus, it is one object of the present invention to provide an improved drive circuit that can be controlled to vary the level of voltage applied to an EL lamp.

It is another object of the present invention to provide an improved drive circuit that can be easily controlled by a manual actuating means to vary the level of voltage applied to an EL lamp.

Another object of this invention is to provide an improved drive circuit that converts power efficiently to EL lamps having different lamp characteristics.

Still another object of this invention is to provide an improved drive circuit for driving an EL lamp used for illumination of timepiece displays.

SUMMARY OF THE INVENTION

The present invention is an improved drive circuit for driving a capacitive electroluminescent lamp of the type having a converter coupled to a power supply source and a signal generating means to produce current pulses, and a charging switching means coupled to the signal generating means, the capacitive electroluminescent lamp and the converter for switching successive current pulses to the capacitive electroluminescent lamp to produce light. The improvement comprises a control means coupled to the power supply source, the signal generating means and the charging switching means for controlling the charging switching means to provide a plurality of sets of the successive current pulses to the capacitive electroluminescent lamp, where each set comprises a different predetermined number of the successive current pulses, a switch coupled to the control means, the switch operating the control means when closed, and a delay means coupled to the power supply source, the signal generating means, the switch and the control means for delaying deactivation of the charging switching means for a predetermined period of time when the switch is opened.

BRIEF DESCRIPTION OF THE DRAWINGS

The subject matter, which is regarded as the invention, is particularly pointed out and distinctly claimed in the concluding portion of the specification. The invention, however, both as to organization and to method of practice, together with further objects and advantages thereof, may best be understood by reference to the following description, taken in connection with the accompanying drawings, in which:

DETAILED DESCRIPTION OF THE PREFERRED EMBODIMENT

Figure 3:
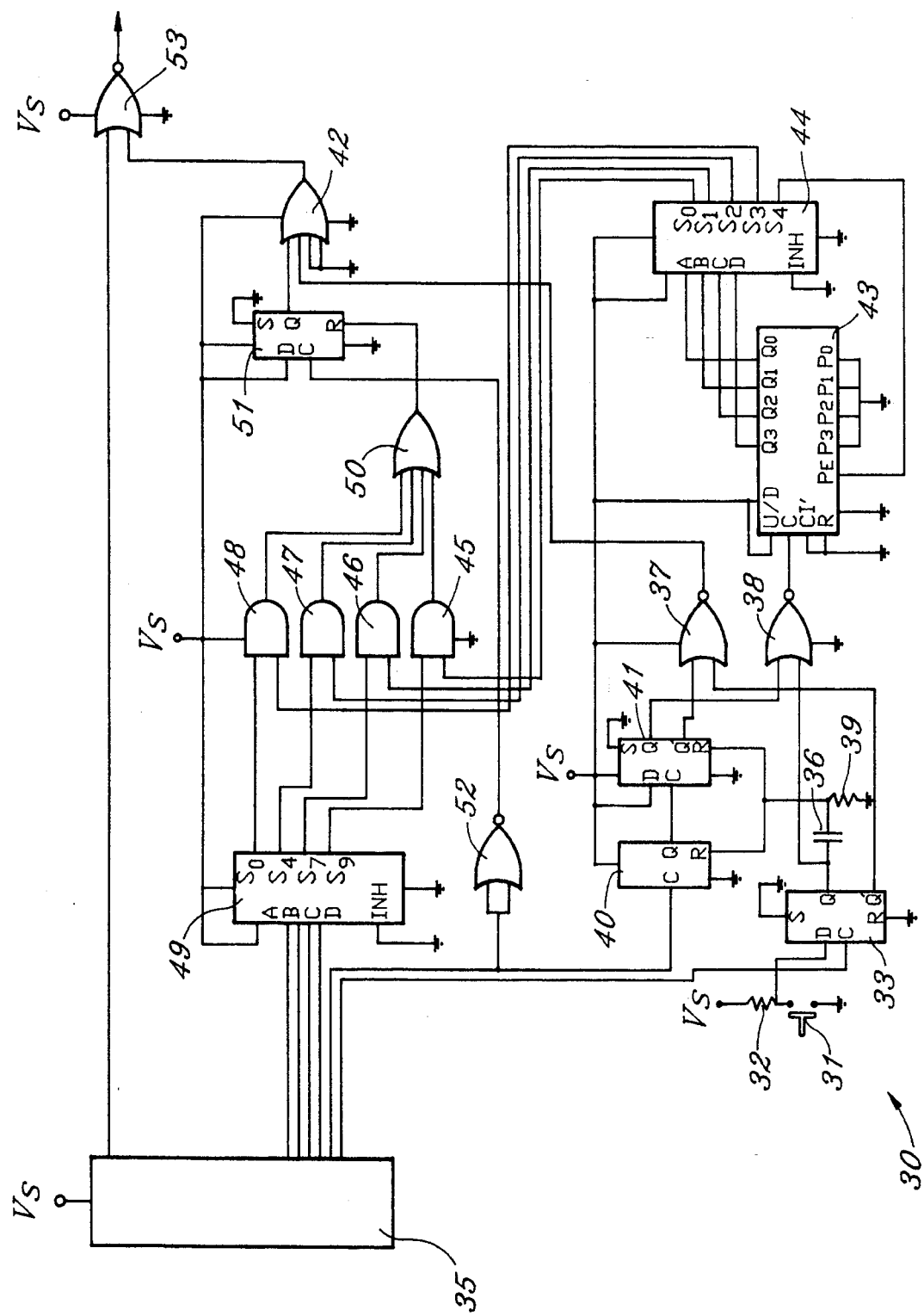
FIG. 3 is a circuit diagram of the adjustable circuit portion of the drive circuit of the present invention.

FIG. 3 illustrates the preferred embodiment of an adjustable circuit portion 30 of a drive circuit of the present invention. The adjustable circuit portion 30, which is also referred to hereinafter as the control means, permits control over the current pulses provided by the drive circuit to an electroluminescent (EL) lamp. Note that the rest of the drive circuit is not shown since a known drive circuit can be used with the adjustable circuit portion 30 to vary the lamp drive. In the preferred embodiment of FIG. 3, the drive circuit disclosed in the aforementioned Kindlmann patent ('096) is contemplated to be utilized in conjunction with the adjustable circuit portion 30. This will be described more fully hereinafter.

The adjustable circuit portion 30 comprises a switch 31 (preferably manually actuatable) having a first terminal connected to a power supply voltage, $V_s$, through a first resistor 32, and a second terminal connected to a ground reference terminal. The first terminal of the switch 31 is also connected to an independent data (D) input of a first dual type D flip-flop 33. The first dual type D flip-flop 33 serves as a switch debouncer, remedying the separation and reconnection of the two contacts of the switch 31 that occur, typically 10 to 100 times over a period of about 1 ms, when the switch 31 is closed. Both a set (S) and reset (R) inputs of the first dual type D flip-flop 33 are connected to the ground reference terminal. A clock (C) input of the first dual type D flip-flop 33 is connected to a frequency divider circuit 35 at a first predetermined frequency. As is understood, the frequency divider circuit or the signal generating means 35 generally comprises serially connected flip-flops connected to the timepiece crystal controlled oscillator. Complementary outputs (Q and Q') of the switch debouncer 33 are connected to a first electrode of a capacitor 36 and a first NOR gate 37, respectively. Output (Q) of the first dual type D flip-flop 33 is also connected to a second NOR gate 38.

A second electrode of the capacitor 36 is connected to the ground reference terminal through a second resistor 39. The second electrode of the capacitor 36 is also connected to reset (R) inputs of a binary counter 40 and a second dual type D flip-flop 41. A clock (C) input of the binary counter 40 is connected to the frequency divider 35 at a second predetermined frequency. An output (Q) of the binary counter 40 is connected to a clock (C) input of the second dual type D flip-flop 41. An independent data (D) input of the second dual type D flip-flop 41 is connected to the power supply voltage, $V_s$. A set (S) input of the second dual type D flip-flop 41 is connected to the ground reference terminal. Complementary outputs (Q and Q') of the second dual type D flip-flop 41 are connected to the second NOR gate 38 and the first NOR gate 37, respectively.

An output of the first NOR gate 37 is connected to a first OR gate 42. An output of the second NOR gate 38 is connected to a clock (C) input of a binary up/down counter 43. The binary up/down counter 43 has a reset (R) and inverted carry in (CI') inputs connected to the ground reference terminal. An up/down (U/D) input of the binary up/down counter 43 is connected to the power supply voltage, $V_s$. Parallel-load inputs ($P_0$, $P_1$, $P_2$ and $P_3$) of the binary up/down counter 43 are connected to the ground reference terminal. Outputs ($Q_0$, $Q_1$, $Q_2$ and $Q_3$) of the binary up/down counter 43 are connected to inputs (A, B, C and D) of a first 4-to-16 line decoder 44, respectively. An inhibit (INH) input of the first 4-to-16 line decoder 44 is connected to the ground reference terminal. Only five out of sixteen outputs of the first 4-to-16 line decoder 44 are utilized. Outputs $S_0$, $S_1$, $S_2$ and $S_3$ are connected to a first AND gate 45, a second AND gate 46, a third AND gate 47 and a fourth AND gate 48, respectively. And output $S_4$ of the first 4-to-16 line decoder 44 is connected to a preset enable (PE) input of the binary up/down counter 43.

A second 4-to-16 line decoder 49 has inputs (A, B, C and D) connected to the frequency divider 35 at a third, fourth, fifth and sixth predetermined frequencies, respectively. An inhibit (INH) input of the second 4-to-16 line decoder 49 is connected to the ground reference terminal. For the second 4-to-16 line decoder 49, only four out of sixteen outputs are utilized. Outputs $S_0$, $S_4$, $S_7$ and $S_9$ are connected to the fourth AND gate 48, the third AND gate 47, the second AND gate 46 and the first AND gate 45, respectively. The reason for selecting these four outputs, as opposed to a different combination of four outputs, is as follows:

Output $S_0$ is HIGH (bit is 1) if inputs (D, C, B and A) are LOW (bit is 0). When all four input bits (D, C, B and A) are LOW, i.e., 0000, this corresponds to integer 0. In the preferred embodiment of the present invention, the EL lamp drive voltage can be set to one of four levels. The fourth level corresponds to sixteen successive current pulses provided by the drive circuit to the EL lamp. The third level corresponds to twelve current pulses provided by the drive circuit to the EL lamp. The second and first levels correspond to nine and seven current pulses, respectively. Thus, there are four different sets of successive current pulses provided, with each set comprising a different predetermined number of successive current pulses. The EL lamp is most bright at the fourth level and least bright at the first level. Output $S_0$ of the second 4-to-16 line decoder 49 corresponds to the fourth level, where the drive circuit provides sixteen current pulses to the EL lamp. The subscript 0 signifies the fact that the sixteen current pulses preselected to be provided by the drive circuit to the EL lamp (as described below, the number of current pulses preselected to charge the EL lamp need not be sixteen) have been reduced by zero. In a similar fashion, output $S_4$ corresponds to the third level, where the current pulses provided by the drive circuit to the EL lamp have been reduced by four pulses. Note that $S_4$ is HIGH if inputs (D, C, B and A) are 0100, respectively. As is known, 0100 corresponds to integer 4. Likewise, output $S_7$ corresponds to the second level, and output $S_9$ corresponds to the first level.

Figure 1:
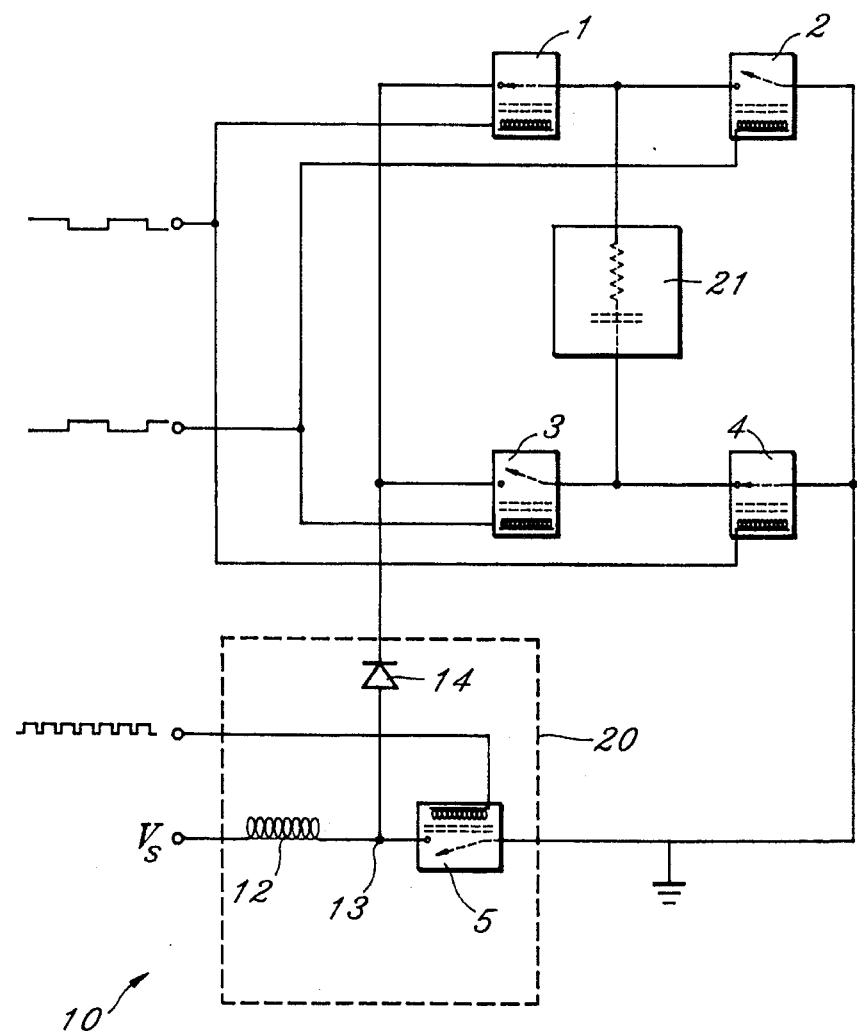
FIG. 1 is a circuit diagram of a known drive circuit for a capacitive electroluminescent lamp.
Figure 2:
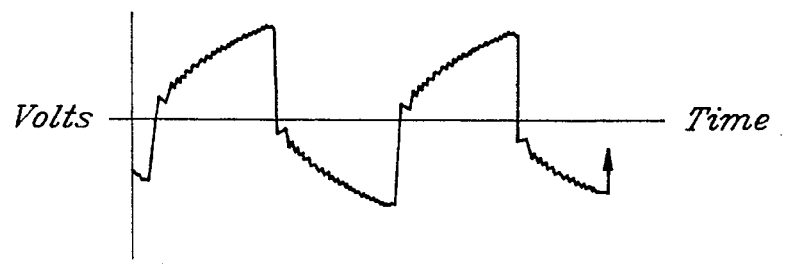
FIG. 2 is a signal diagram showing the charging signals provided by the drive circuit of FIG. 1.

Outputs of the first, second, third and fourth AND gates 45, 46, 47 and 48 are connected to a second OR gate 50. Output of the second OR gate 50 is connected to a reset (R) input of a third dual type D flip-flop 51. The third dual type D flip-flop 51 has an independent data (D) input connected to the power supply voltage, $V_s$, a set (S) input connected to the ground reference terminal and a clock (C) input connected to an output of a third NOR gate 52. Both inputs of the third NOR gate 52 are connected to the frequency divider 35 at the second predetermined frequency. An output (Q) of the third dual type D flip-flop 51 is connected to the first OR gate 42. Output of the first OR gate 42 is connected to a fourth NOR gate 53. The other input of the fourth NOR gate 53 is connected to the frequency divider 35 at a seventh predetermined frequency. Finally, output of the fourth NOR gate 53 is connected to switch 5 of the aforementioned Kindlmann patent (note that the Kindlmann patent is illustrated in FIG. 1).

The adjustable circuit portion 30 of FIG. 3 operates in substantially the following manner:

When switch 31 is pressed (i.e., closed), the EL lamp drive voltage is driven to the first, second, third or fourth level. The level at which the EL lamp is driven is the same as the level previously set, or if not previously set, the power-up default of the drive circuit. The power-up default may be set to any one of the four brightness levels desired. When switch 31 is released (i.e., opened), the drive circuit does not immediately stop providing current pulses to the EL lamp; i.e., is not immediately deactivated. There is a 1 second turn off delay period, which is created by the binary counter 40, the second dual type D flip-flop 41 and the second NOR gate 38 (delay means). The turn off delay period may be any preselected period of time.

Figure 4:
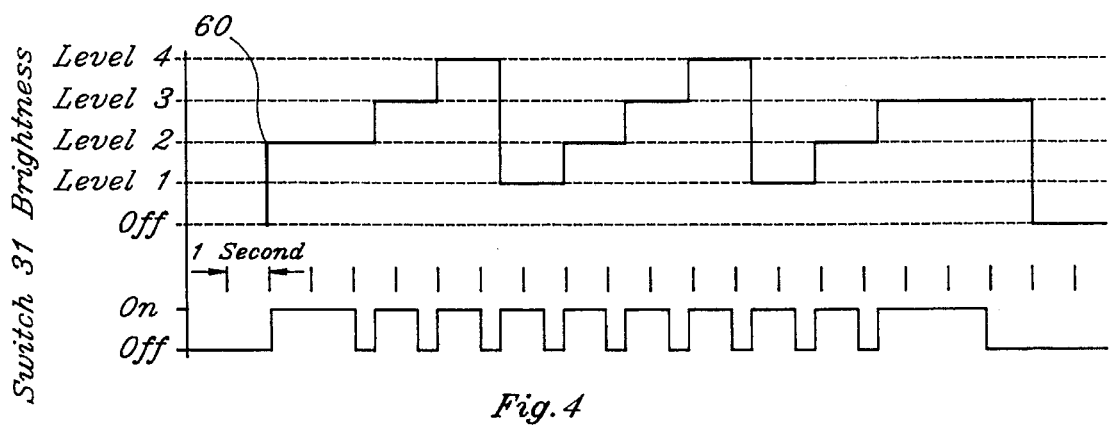
FIG. 4 illustrates the brightness level advancing through four different levels in accordance with the present invention.

If, after switch 31 is released, it is again pressed during the 1 second delay period, the level at which the EL lamp is driven by the drive circuit changes to the next higher level (e.g., second level to third level). EL lamp brightness is advanced one level because the binary up/down counter 43 is clocked, advancing the first 4-to-16 line decoder 44 one brightness level. Note that the 1 second delay is reset (i.e., starts over), since as output (Q) of the switch debouncer 33 goes HIGH, the reset (R) inputs of the binary counter 40 and the second dual type D flip-flop 41 go HIGH. If, after the fourth level is reached, switch 31 is pressed again within the 1 second delay period, the EL lamp is driven by the drive circuit at the first level of brightness (seven current pulses). The reason for this is that following the fourth level, the first 4-to-16 line decoder 44 presets the binary up/down counter 43 back to the first level via output $S_4$ connected to the preset enable (PE) input. FIG. 4 illustrates the brightness level advancing through the four different levels. The previously set level in FIG. 4 is the second level, as indicated by line 60.

Figure 5:
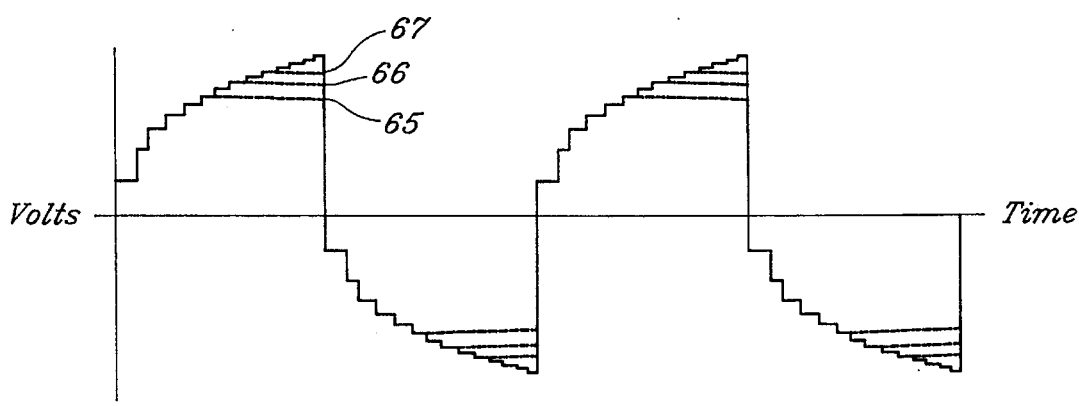
FIG. 5 is a signal diagram showing four different charging signals provided by the drive circuit of the present invention.

The current pulses provided by the drive circuit of the present invention to progressively charge the EL lamp are illustrated in FIG. 5. Dotted lines 65, 66 and 67 indicate the first, second and third levels of brightness, respectively. When the switch 31 is pressed, a signal is sent to switch 5 of the aforementioned Kindlmann patent (FIG. 1) via the fourth NOR gate 53. For the first, second and third levels, the signal sent to switch 5 inhibits the switching circuit of the Kindlmann patent from providing more current pulses to the capacitive EL lamp than the number of current pulses corresponding to each level. Thus, for example, the switching circuit is inhibited from providing more than seven current pulses at the first level. Line 65 shows where the current pulses would cease, prior to the discharging and the polarity reversal of the EL lamp. Note that lines 65, 66 and 67 are sloped slightly downward since as inhibition is taking place, there is some dissipation. The fourth level of brightness, which corresponds to sixteen current pulses, requires no inhibition of the switching circuit of the Kindlmann patent because in FIG. 5, sixteen current pulses are the maximum number provided by the switching circuit to the capacitive EL lamp. Therefore, when the signal corresponding to the fourth level is outputted by the fourth NOR gate 53 to switch 5 of the Kindlmann patent (FIG. 1), no inhibition of the current pulses occurs.

Figure 6:
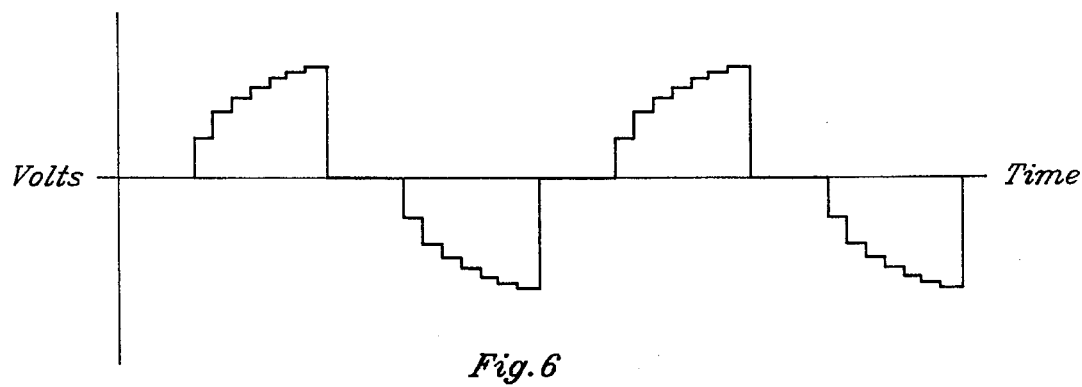
FIG. 6 is a signal diagram showing the charging signals for the lowest level of brightness provided by the drive circuit of the present invention, where current pulse inhibition occurs at the beginning of the charging cycle.

In FIG. 5, any inhibition which occurs (for first, second and third levels of brightness) takes place after the current pulses have been provided to the EL lamp. The drive circuit of the present invention may also be directed, with relative ease, to inhibit current pulses prior to the current pulses being provided to the EL lamp. FIG. 6 illustrates this for the first level, where seven current pulses are switched to the EL lamp subsequent to an initial inhibition period.

Although the fourth level of brightness has been associated with sixteen current pulses heretofore, there is nothing requiring that this be so. As described in the Kindlmann patent, the number of current pulses charging the capacitive electroluminescent lamp may be eight, sixteen or thirty-two (column 9, lines 6–8). Hence, the fourth level could correspond to eight, sixteen (as described heretofore), thirty-two or any other number between four and thirty-two. Also, there is no reason why there could not be more than or less than four levels of brightness. Furthermore, as is understood, the components comprising the adjustable circuit portion 30 of FIG. 3 may be replaced by others to achieve the same results. Finally, the adjustable circuit portion 30, along with the drive circuit to be used therewith, preferably the drive circuit disclosed in the Kindlmann patent, may be disposed on an integrated circuit chip.

Note that the present invention is compatible with U.S. Pat. No. 4,912,688, issued on Mar. 27, 1990 and assigned to the assignee of the present invention. The '688 patent discloses a transfer logic means for a wrist instrument having a plurality of manually actuated switches, the transfer logic means being actuated by continually pressing (i.e., closing) a first switch for a first predetermined time period. Once actuated, the transfer logic means causes an illuminating lamp in the wrist instrument to automatically light for a second predetermined time period whenever a switch other than the first is actuated. The transfer logic means is manually deactivated by continually pressing the first switch for a third predetermined time period. If the transfer logic means is not manually deactivated within a fourth predetermined time period, it is automatically deactivated.

The operation of the present invention need not change to accommodate the '688 patent. As described hereinabove, when switch 31 is pressed (FIG. 3), the EL lamp drive voltage is driven to the first, second, third or fourth level. The level at which the EL lamp is driven is the same as the level previously set, or if not previously set, the power-up default of the drive circuit. If switch 31 remains pressed continually for the first predetermined time period, the transfer logic means will be actuated. If, after switch 31 is released, it is again pressed during the 1 second delay period, the level at which the EL lamp is driven by the drive circuit changes to the next higher level (e.g., second level to third level). To deactivate the transfer logic means, switch 31 must be continually pressed for the third predetermined time period. It should be apparent that as long as the first and third predetermined time periods are not the same as the time it takes for switch 31 to drive the EL lamp (which is preferably instantaneous), there will be no problem in combining the '688 patent and the present invention.

While there has been described what is considered to be the preferred embodiment of the invention, other modifications will occur to those skilled in the art, and it is desired to secure in the appended claims all such modifications as fall within the true spirit and scope of the invention.

We claim:

1. An improved drive circuit for driving a capacitive electroluminescent lamp of the type having a converter coupled to a power supply source and a signal generating means to produce current pulses, and a charging switching means coupled to the signal generating means, the capacitive electroluminescent lamp and the converter for switching successive current pulses to the capacitive electroluminescent lamp to produce light, wherein the improvement comprises:

a control means coupled to the power supply source, the signal generating means and the converter for controlling the charging switching means to provide at least two sets of successive current pulses to the capacitive electroluminescent lamp, where each set comprises a different predetermined number of successive current pulses; and the control means including a switch, the actuation of which selects the set of successive current pulses to be provided to the capacitive electroluminescent lamp, and wherein the control means further includes a delay means coupled to the switch for delaying deactivation of the charging switching means for a predetermined period of time when the switch is opened, said control means switch being adapted to select a different set of successive current pulses if said switch is closed during said predetermined period of time.

2. The drive circuit of claim 1, wherein the control means further includes a counting means for counting the number of sets of successive current pulses and storing the count corresponding to the last set selected by way of the switch, the counting means advancing the count to correspond to the next set of successive current pulses upon actuation of the switch within the predetermined period of time during which the deactivation of the drive circuit is delayed.

3. The drive circuit of claim 2, wherein the control means further includes a circuit means responsive to the actuation of the switch for providing to the capacitive electroluminescent lamp the predetermined number of successive current pulses corresponding to the set having its count stored in the counting means.

4. The drive circuit of claim 1, wherein the delay means includes a binary counter.

5. The drive circuit of claim 1, wherein the predetermined period of time is approximately 1 second.

6. The drive circuit of claim 1, wherein the successive current pulses progressively charge the capacitive electroluminescent lamp.

7. An improved drive circuit for driving a capacitive electroluminescent lamp of the type having a converter coupled to a power supply source and a signal generating means to produce current pulses, and a charging switching means coupled to the signal generating means, the capacitive electroluminescent lamp and the converter for switching successive current pulses to the capacitive electroluminescent lamp to produce light, wherein the improvement comprises:

a control means coupled to the power supply source, the signal generating means and the converter for controlling the charging switching means to provide a plurality of sets of successive current pulses to the capacitive electroluminescent lamp, where each set comprises a different predetermined number of successive current pulses; and the control means comprising a manually actuatable switch coupled to a switch debouncer, the actuation of which during a preselected delay period, selects the set of successive current pulses to be provided to the capacitive electroluminescent lamp.

8. The drive circuit of claim 7, wherein the control means further comprises a delay means coupled to the manually actuatable switch for delaying deactivation of the drive circuit by a predetermined period of time when the switch is opened.

9. The drive circuit of claim 8, wherein the control means further comprises a counting means for counting the number of sets of successive current pulses and storing the count corresponding to the last set selected by way of the manually actuatable switch, the counting means advancing the count to correspond to the next set of successive current pulses upon actuation of the switch within the predetermined period of time during which the deactivation of the drive circuit is delayed.

10. The drive circuit of claim 9, wherein the control means further comprises a circuit means responsive to the actuation of the switch for providing to the capacitive electroluminescent lamp the predetermined number of successive current pulses corresponding to the set having its count stored in the counting means.

11. The drive circuit of claim 8, wherein the delay means comprises a binary counter.

12. The drive circuit of claim 8, wherein the predetermined period of time is approximately 1 second.

13. The drive circuit of claim 7, wherein the switch debouncer is a dual type D flip-flop.

* * * * *